United States Patent [19]

Metz

[11] 4,198,872
[45] Apr. 22, 1980

[54] MECHANICAL SCREW TRANSMISSION

[75] Inventor: Joseph R. Metz, Ridgefield, Conn.

[73] Assignee: Norco, Inc., Ridgefield, Conn.

[21] Appl. No.: 929,196

[22] Filed: Jul. 28, 1978

[51] Int. Cl.² ............................................. F16H 25/12
[52] U.S. Cl. .................................. 74/57; 74/424.8 R; 74/424.8 NA
[58] Field of Search ........... 74/57, 424.8 R, 424.8 NA

[56] References Cited

U.S. PATENT DOCUMENTS

| | | | |
|---|---|---|---|
| 1,233,858 | 7/1917 | Farmer | 74/57 X |
| 2,844,969 | 7/1958 | Lohr | 74/424.8 NA |
| 3,250,147 | 5/1966 | Barton et al. | 74/424.8 R |
| 3,296,880 | 1/1967 | Maroth | 74/424.8 R |
| 3,636,780 | 1/1972 | Wallace | 74/424.8 NA |
| 3,968,705 | 7/1976 | Amano et al. | 74/424.8 R |
| 4,031,765 | 6/1977 | Metz | 74/57 |
| 4,138,902 | 2/1979 | Brusasco | 74/424.8 R |

*Primary Examiner*—Louis Rimrodt
*Attorney, Agent, or Firm*—H. Gibner Lehmann; K. Gibner Lehmann

[57] ABSTRACT

A low-friction light-load mechanical transmission for converting between rotary and linear motion, comprising a screw shaft having a helical thread groove, and a nut body having a radially movable socket member in which there is received a thread-engaging ball. The socket member has a circular load surface surrounding a circumference of the ball, and a second load surface centrally located with respect to the circular load surface and displaced laterally therefrom. The second load surface of the socket member engages the ball along a relatively small area thereof. The helical thread groove is characterized by a pair of co-extensive, helical troughs, each trough being partially circular in cross section. The troughs intersect one another adjacent the root of the thread groove, each trough having a radius of curvature slightly greater than the radius of the ball. The arrangement is such that for a given direction of relative axial movement between the nut body and screw shaft, the ball has a relatively small area of contact with the surface of only one trough, at a point on the ball which is substantially aligned with but opposite to the resultant of the forces existing between the ball and the socket member. The socket member is resiliently backed by a single, bowed snap ring which locks into an annular groove in the nut body. The transmission finds use in ticket printers, X-ray camera shutters, and kindred light-duty devices.

19 Claims, 11 Drawing Figures

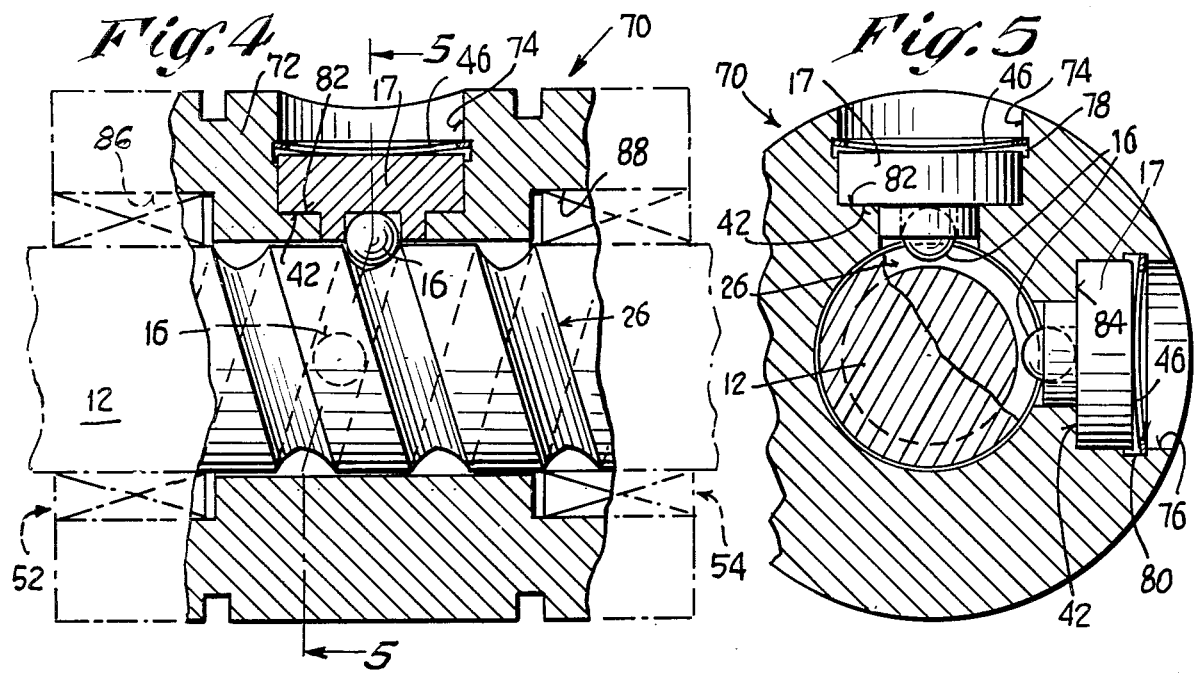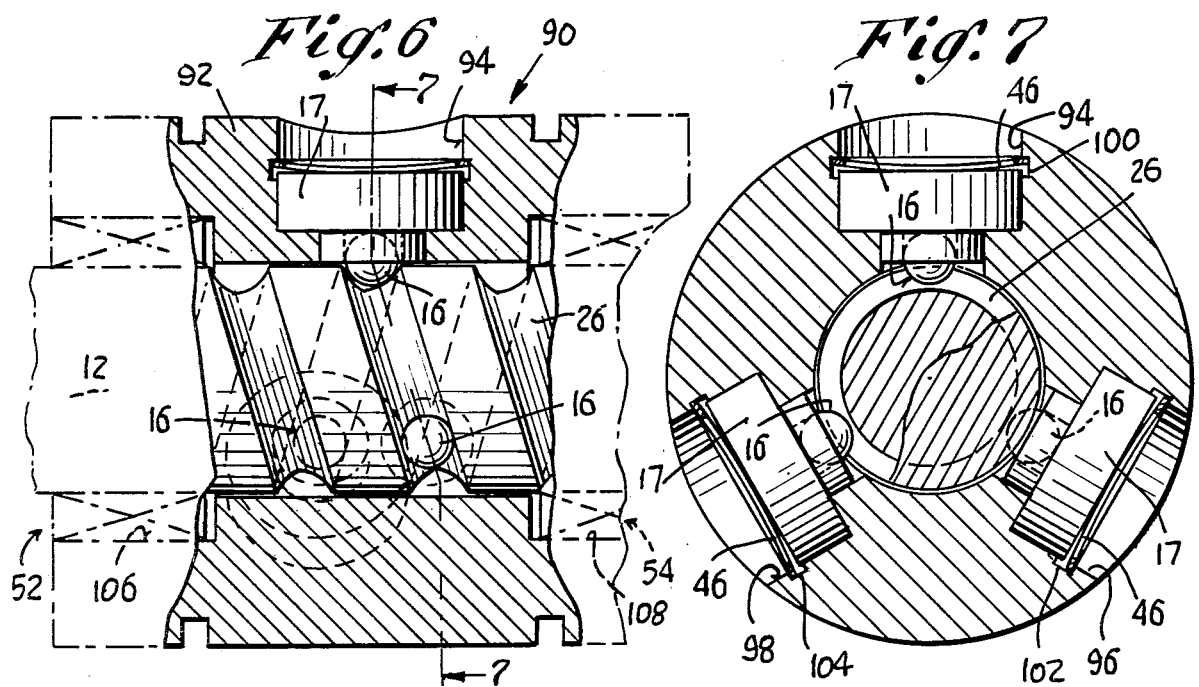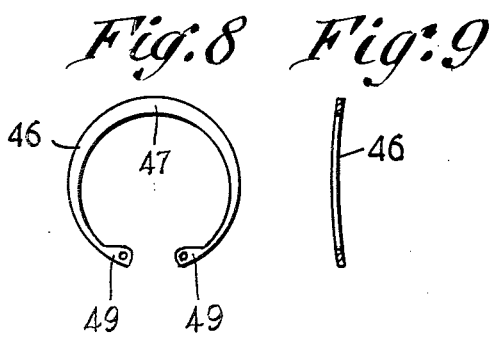

MECHANICAL SCREW TRANSMISSION

BACKGROUND

This invention relates generally to low-friction mechanical transmissions for converting between rotary and linear motion, and more particularly to devices of this type which are intended to operate with a minimum of wear between the various moving parts.

In the past a number of different roller-type and ball-type transmissions have been proposed and produced, and have met with varying degrees of commercial success.

One such arrangement is shown in U.S. Pat. No. 3,296,880 issued to Arthur M. Maroth, which discloses a screw and nut device wherein the nut body is provided with multiple rollers having special conical tips which were adapted to engage modified square threads of the screw. The rollers were carried on anti-friction bearings such that most of the friction between the rollers and the surface of the screw threads was of the rolling kind, as opposed to the sliding type. This particular device functioned quite well, although it tended to be expensive to manufacture and assemble due to the relatively large number of parts involved and the close tolerances associated with such parts, which were necessary in order to insure reliable and trouble-free performance.

Another type of mechanism of the kind described is disclosed in U.S. Pat. No. 4,031,765 issued to Joseph R. Metz and having common ownership with the present application. The system shown therein involves a diamond-threaded screw and nut arrangement wherein a series of balls carried by the nut is capable of shifting in axial directions with respect thereto, making it possible for the nut to automatically reverse its axial direction of travel with respect to the screw when it arrives at either of the opposite ends thereof.

The particular thread form employed in the above device involved shallow thread grooves of scalloped configuration, such grooves being essentially semi-circular in cross section. With the application of relatively heavy loads to the nut, there was a pronounced tendency for a load carrying ball to hug or to ride on the sides of the grooves, and thus impose severe load stresses thereon. At these points, the groove surfaces did not cradle effectively the spherical surface of the balls, since in actuality the groove reactive forces involve hemispherical surfaces of the balls, which are not adequate to cradle or nest the balls for resisting loading. In consequence, the side surfaces of the grooves suffered excessive wear, as did the sockets of the nut body. Also, areas of the grooves near the crest of the screw were particularly susceptible to wear, since the balls tended to ride up the sides of the grooves to an appreciable extent, under heavy loading.

Ideally it was desired that all of the balls which were involved in carrying the load share the same equally. With the designs of the prior art devices, this was not always the case. Since devices of these types are not only employed in ticket printer mechanisms but also in automatic machinery where long life expectancy and freedom from premature failure are required, it was important to minimize, from the standpoint of the design of such parts, arrangements which were susceptible to jamming, binding or excessive wear. While these prior devices performed a useful functional life and had wear resistance up to a point, the poor loading conditions and resulting excessive wear appreciably limited their utility. Some prior devices, notably involving tapered rollers, had resilient backing means constituted of multiple components including at least one bowed spring washer. The make-up of the resilient backing, with its multiple components, represented an appreciable added cost in material and labor, which was especially undesirable where a large number of tapered rollers was required in a single transmission unit.

SUMMARY

The above drawbacks and disadvantages of prior mechanical transmissions are obviated by the present invention which has for an object the provision of a novel and improved, especially simple, low-friction mechanical transmission which is characterized by improved capacity for loading and appreciably-reduced wear of the cooperable components.

A related object of the invention is the provision of an improved mechanical transmission as above, wherein the friction encountered is largely of the rolling kind, and wherein the areas of contact between the relatively moving parts are increased an extent while still not introducing appreciable sliding engagement between the cooperable surfaces to the point where increased friction and heat are produced.

A still further object of the invention is to provide an improved mechanical transmission utilizing rolling balls to convert between rotary and linear movement, which is so arranged that a more complete nesting of the ball surface is had for the various load conditions, resulting in a distribution of the load forces that reduces wear and prolongs the useful life.

Anoter object of the invention is to provide an improved mechanical transmission in accordance with the foregoing, which has especially simple means to equalize the loads when multiple ball elements are utilized in a single unit.

Yet another object of the invention is the provision of an improved transmission as above characterized, wherein the assembly can be readily effected with a minimum of effort, and wherein the requirements for maintenance are greatly reduced or eliminated.

Still another object of the invention is the provision of a mechanical transmission in accordance with the foregoing, which is characterized by smooth operation and freedom from excessive wear of the various parts, resulting in a device which can be safely operated and used over extended periods of time.

The above objects are accomplished by a unique low-fricion mechanical transmission for converting between rotary and linear motion, comprising an elongate screw shaft having a helical thread groove, and a nut body movable along the screw shaft and having a recess in which a thread-engaging ball is carried. The recess has a circular load surface which surrounds and engages points along a circumference of the ball, and a second load surface centrally disposed with respect to the first surface and displaced laterally therefrom. The other load surface provides a backing for the ball, and engages a relatively small surface thereof.

The screw shaft has a thread groove characterized by a pair of substantially helical intersecting troughs, each trough being partially circular in cross section and the troughs intersecting one another adjacent the root of the groove. The radii of curvature of the troughs is somewhat greater than the radiius of the ball whereby the latter is adequately nested, as to its spherical surfaces, and yet has a relatively small area of contact with the surface of a trough at the point on the ball which, as the nut body traverses the screw shaft, is substantially aligned with and opposite to the resultant of two forces that exist between the ball and nut recess. The arrangement is such that the ball experiences balanced forces and can rotate about an axis of its own, without excessive pressures being developed on either the surfaces of the recess which carry the ball, or on the surfaces of the troughs in the screw shaft. Because of the nesting engagement which the screw groove has with the ball, as effected by a displacement in the direction of the reactive forces of the screw, there is had a lessening of the load force between the side walls of the recesses which carry the ball, and an increase in those forces in the recesses which act radially inward and which heretofore did not assume a sufficient part of the load. The reactive forces on the ball are thus more nearly equalized, as compared with prior transmission constructions of this type.

Additionally, the socket members carried by the nut are resiliently backed in an extremely simple manner, by the use of single, bowed resilient snap retainer rings which not only hold the socket members captive but also apply a bias to the balls which tends to eliminate backlash as well as to equalize loading.

Other features and advantages will hereinafter appear.

In the drawings:

FIG. 4 is a vertical section of a somewhat modified mechanical transmission, constituting another embodiment of the invention.

FIG. 5 is a section taken on line 5—5 of FIG. 4.

FIG. 6 is a vertical section of a further modified mechanical transmission, constituting yet another embodiment of the invention.

FIG. 7 is a section taken on line 7—7 of FIG. 6.

FIG. 8 is a top plan view of a bowed, snap retainer washer employed in the transmissions illustrated in FIGS. 1-7.

FIG. 9 is a side elevation of the retainer washer of FIG. 8.

Figure 1:
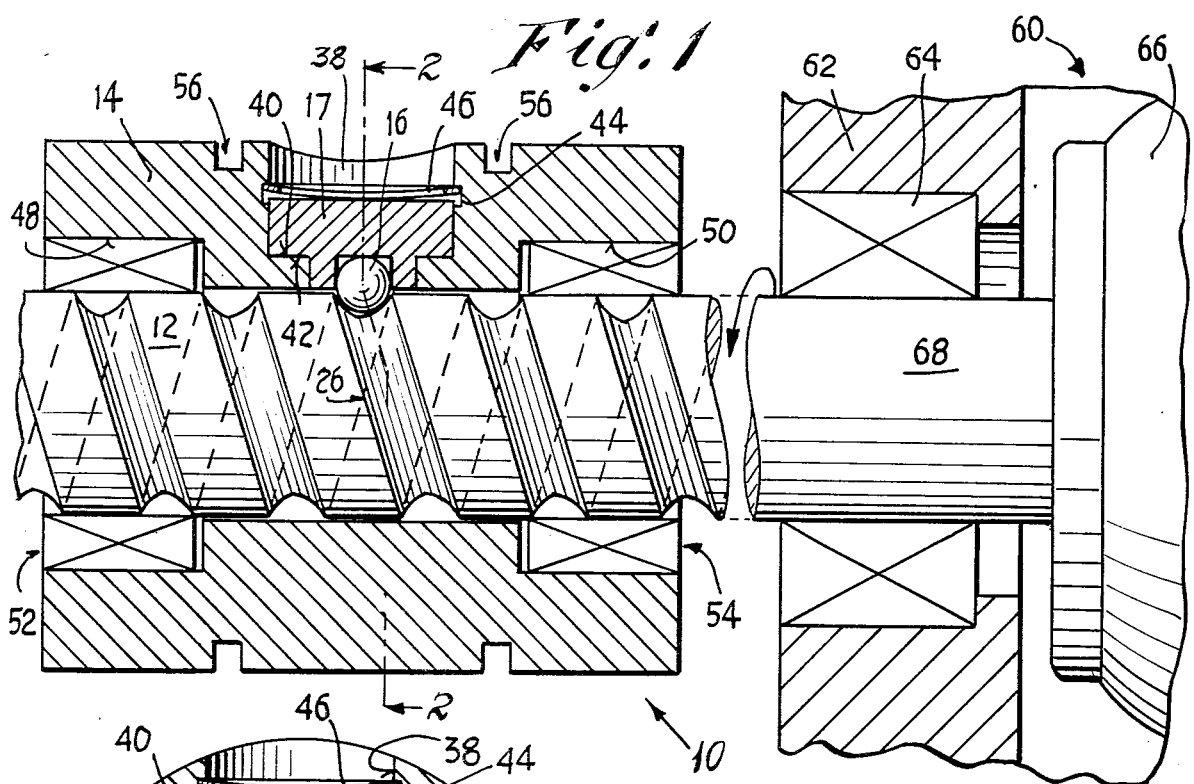
FIG. 1 is a vertical section of the improved mechanical transmission of the present invention, comprising an elongate screw shaft and cooperable nut body axially movable with respect thereto.
Figure 2:
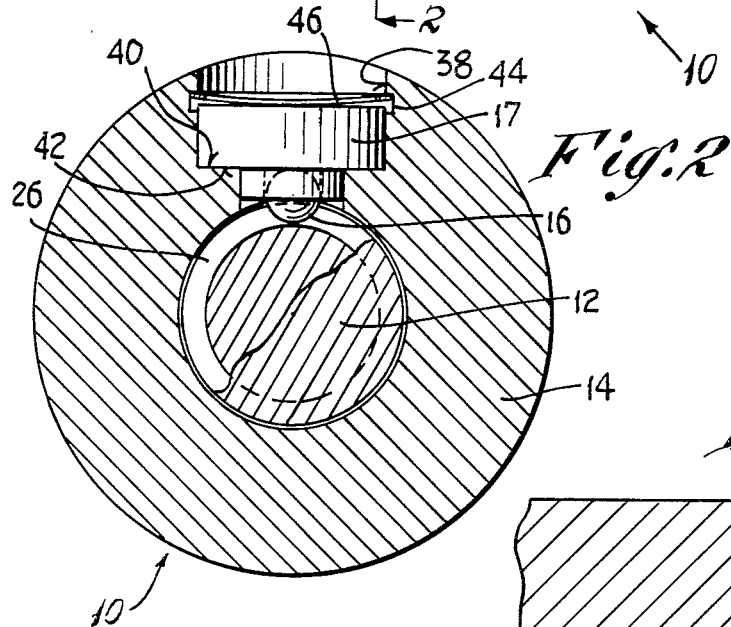
FIG. 2 is a section taken on line 2—2 of FIG. 1.
Figure 3:
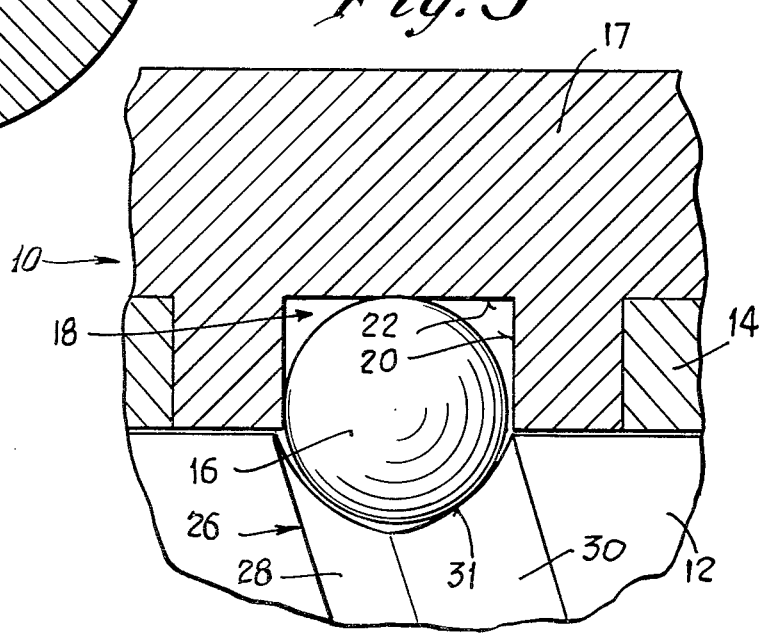
FIG. 3 is a fragmentary vertical section, greatly enlarged, of a portion of the screw shaft and nut body, and particularly illustrating details of the mounting for a ball element carried by the body.

Referring to FIGS. 1-3 there is illustrated a low-friction mechanical transmission for converting between rotary and linear motion with appreciably reduced backlash, the device comprising an elongate screw shaft 12, an annular nut body 14, and a ball element 16 carried thereby.

In accordance with present invention, there is provided a novel thread form on the screw shaft 12, which, together with a unique socket configuration on the nut body, confines the ball element 16 and enables the latter to undergo rolling movement about its own axis as the nut body traverses the screw shaft 12. As shown, the ball element 16 is disposed in a recess 18 of a socket or cup member 17, having an annular wall 20 of generally cylindrical configuration, and a bottom wall 22, both of which back up the ball element 16 as the latter undergoes rotation. The wall 20 has a circular surface adjacent to but disposed just inside the lip of the cup, which engages the ball element 16 at a circumferential point thereon. The bottom wall 22 is spaced laterally from this circular surface, and is centrally disposed with respect thereto.

The screw 12 is provided with a helical groove generally designated by the numeral 26, comprising a pair of substantially helical troughs 28, 30, each of the said troughs intersecting one another adjacent the root or smallest diameter point of the groove 26. Both troughs 28, 30 are essentially partially circular in cross section, and have a radius of curvature which sightly exceeds the radius of the ball element 16, whereby the latter has a relatively small area 31 of contact with the surface of either trough 28, 30 as the nut body 14 moves axially in one direction or another with respect to the screw shaft 12. In addition, as particularly illustrated in FIG. 10, the forces applied to the ball element 16 by the walls 20, 22 are indicated generally by the arrows 32, 34. These forces are essentially in a radial direction with respect to the ball element 16, and the resultant of these forces 32, 34 tends to oppose the force applied by the trough 30 to the ball, this force being designated by the arrow 36. The arrangement is such that the point of engagement of the ball 16 with the trough 30 lies along a line which is coincidental with the resultant of the forces which are represented by the arrows 32, 34. It is seen that this point of engagement is midway between the root of the groove 26 and the crest thereof, or in other words, near the helical centerline of the trough 30.

Referring again to FIG. 3, it can be seen that the ball element 16 is fully seated in the recess 18, the radius of the latter being slightly greater than the radius of the ball.

As shown in FIG. 1, the nut body 14 is provided with a substantially radial bore 38 in which the socket member 17 is carried. There is provided in the radial bore an annular shoulder 40, which is cooperable with a corresponding shoulder 42 on the member 17, such that radially inward movement of the member 17 is positively limited by engagement of these shoulders. In addition, in accordance with the present invention, there is further provided a transverse groove 44 in the bore 38, and a bowed retainer washer 46 is carried therein, and constitutes an extremely simple spring means engaging the member 17 and biasing the latter in a radially inward direction such that the shoulders 40, 42 are normally in engagement with one another. The retainer washer 46 is particularly shown in FIGS. 8 and 9, and is seen to have a yoke portion 47 of increased width, and end portions 49 of increased width, all of which are adapted for engagement with the socket member 17 to positively hold the same captive. With such an arrangement, under certain circumstances it is possible for the member 17 to yield somewhat in a radially outward direction, in response to force exerted thereon by the ball element 16. Such a momentary radially outward yielding would occur in the event that an excessive axial load was applied between the screw shaft 12 and nut body 14. Under such circumstances, the shoulders 40, 42 would separate from one another. Upon removal of the excessive load, the washer 46 would return the member 17 to the position illustrated in FIG. 1, wherein the shoulders 40, 42 would again engage one another.

Referring again to FIG. 1, the opposite ends of the nut body 14 are provided with annular recesses 48, 50 in which there are respectively carried end bearings 52, 54 for sliding engagement with the cylindrical surface of the screw shaft 12. In practice, the bearings 52, 54 can be either of the roller-bearing type, or the sleeve-bearing type, and are merely pressed into the corresponding recess 48 or 50. The bearings operate to maintain the nut body 14 centralized with respect to the screw shaft 12, such that there is normally little or no lateral variation in the position of the nut body, which might upset the smooth rolling movement of the ball element 16 in the trough 30 or 28.

As illustrated, the nut body 14 can be provided with annular groves 56, for attachment to a suitable fork, actuator arm, etc (not shown).

In normal operation, the screw shaft 12 is adapted to be driven by an electric motor 60, having a casing 62, bearing 64 and motor windings 66. The motor shaft 68 can if desired be made integral with the screw shaft 12, such that there are minimized or eliminated problems of alignment.

The operation of the improved transmission of the present invention can now be readily understood by referring to FIGS. 1–3 and 10. The ball element 16 is normally engaged with the bottom wall 22 of the recess 18. However, depending upon the axial direction of travel of the nut body with respect to the screw shaft, the ball element 16 will ride in one or the other of the troughs 28, 30, and will engage the annular wall 20 of the recess 18 at a point which is disposed opposite to the location of the particular trough. For instance, if it is assumed that the nut body is non-rotating, and the screw shaft 12 is being turnably driven by the motor 60 in the direction of rotation indicated by the arrow in FIG. 1, the nut body will be traveling toward the left with the ball element 16 riding in the trough 30, and engaging the annular wall 20 of the recess 18 at the point which is adjacent to the location of the trough 28. It is noted that the ball is completely disengaged from this latter trough 28, as illustrated in FIG. 3.

The arrows 32, 34 indicate the force applied to the ball 16 by the annular wall 20 and the bottom wall 22, these being disposed generally normal to such walls. The ball also experiences an additional force 36 acting through a point in the trough 30 which is disposed near the middle thereof. Because of the location of the force indicated by the arrow 36, in the present device the force component indicated by the arrow 32 has been advantageously reduced, and the component 34 increased, over those occuring in the devices of the prior art, this giving rise to reduced wear of the thread groove 26 and recess 18 as noted above. It can now be understood that the arrangement results in the forces acting on the ball being more uniform and evenly distributed, in conjunction with the elimination of areas of high intensity pressure on the walls of the thread and socket. Also I have found that with three distinct points of engagement as in the present case, an especially smooth, uniform rate of travel occurs, with freedom from binding or jamming. During the operation, the ball rotates on an axis of its own, as can be readly understood. Suitable lubricant can be applied to the recess, to minimize the sliding friction betweeen the ball 16 and the walls 20, 22. In addition, lubricant is preferably applied to both troughs 28, 30 of the groove 26, such that where sliding movement of the ball is required, there will be no tendency for binding, or seizing of the various moving parts.

The present construction is seen to have the following advantages. Assembly is greatly simplified, since the end bearings provided between the nut body and the screw shaft can be merely pressed into place, without the need for special adhesives and the like. Similarly, the installation of the ball 16 and socket member 17 is greatly facilitated. For instance, in FIG. 1 it is only necessary to align one point of the thread groove 26 with the radial bore 38, thereafter insert the ball 16 into the bore such that is becomes seated in the groove, and install the socket member 17, by means of the single retainer washer 46.

Figure 10:
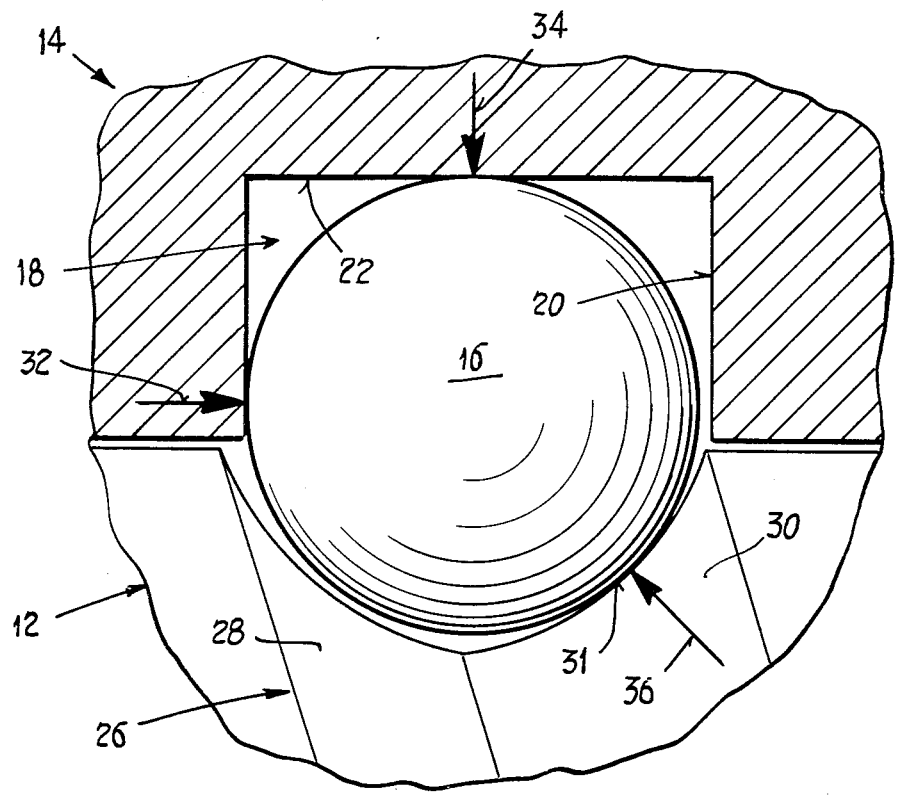
FIG. 10 is a fragmentary view, greatly enlarged, of a portion of the screw shaft and nut body of the transmission of FIGS. 1-3, and particularly illustrating the forces acting on a ball element associated therewith.

The above construction have been found to be highly resistant to damage from excessive wear. Referring to FIG. 10, it can be seen that the area of the trough 30 which engages the ball is disposed near its midpoint. Accordingly, due to the backing provided by the bottom wall 22 of the recess 18, the tendency for the ball to ride up the side of the trough (toward the crest of the screw shaft) is greatly minimized. Accordingly, the ball is at all times held in a fairly low position in the trough 30, by virtue of this backing. It will be understood that in the event that an especially heavy load is encountered, some yielding of the socket member 17 in a radially outward direction can occur, in which case the ball will ride up the side of the trough 30 somewhat. However, upon removal of such a load, the ball will return to the position illustrated in FIG. 10.

While the above discussion has been confined to the engagement of the ball with the walls of the trough 30, it can be readily understood that in the event the direction of rotation of the screw shaft is reversed, the ball will become fully disengaged from the walls of the trough 30, and will be shifted into the trough 28. Also, the ball will engage the wall 20 at a point diametrically opposite that point of engagement shown in FIG. 10.

In attaining consistently smooth operation of the device described above I have found that the spiral formed by the multiple points of engagement of the ball with the one trough, and the crest diameter of the screw shaft should be held concentric with one another, to within 0.2% or better. Thus, for a 1" diameter screw shaft, the concentricity should be within 0.002", for satisfactory results.

Another embodiment of the invention is illustrated in FIGS. 4 and 5 showing a modified transmission generally designated by the numeral 70, involving a screw shaft 12 having a helical thread groove 26 in the form of intersecting troughs, as in the previous embodiment, and a nut body 72. The body has a pair of radial bores 74, 76, in which there are disposed ball-carrying socket members 17 which are substantially identical to that illustrated and described in connection with the first-mentioned embodiment.

The bores 74, 76 have transverse grooves 78, 80 which receive retainer washers 46 of the type shown in FIGS. 8 and 9. The socket members have shoulders 42, which are cooperable with corresponding shoulders 82, 84 respectively of the bores 74, 76 for positioning the members 17 in their operative positions. As in the previous case, the members 17 each have a recess 18 in the form of a cup, which carries the respective balls 16, each of the latter being engageable along a circumferential line with the circular load surface 20 (see FIG. 3), and being also engageable with the bottom wall 22 of the recess 18 at a relatively small area.

As can be readily understood, the socket members 17 (and balls 16) are axially spaced from one another according to the requirements of the pitch of the thread groove 26. In the present instance, the axial spacing is equal to one-quarter of the thread pitch, assuming that the members 17 in FIG. 5 are circumferentially spaced from one another by 90°.

Referring again to FIG. 4, and further in accordance with the present invention the opposite ends of the nut body 72 are provided with annular recesses 86, 88, in which there are press-fitted suitable end bearings 52, 54. As mentioned above, these bearings operate to maintain the axial alignment of the nut body 72 with respect to the screw shaft 12, and are slidably engaged thereby.

Yet another embodiment of the invention is illustrated in FIGS. 6 and 7, showing a still further modified mechanical transmission generally designated by the numeral 90 and comprising a screw shaft 12, and a nut body 92, having three radial bores 94, 96 and 98. The latter are provided with transverse grooves 100, 102 and 104, which in turn carry retainer rings 46 similar to that illustrated in FIGS. 8 and 9. Disposed in the bores 94, 96 and 98 are ball-carrying socket members 17 substantially identical to those already described, and ball elements 16 which are adapted to engage the walls of the thread groove 26. As particularly illustrated in FIG. 7, three such members 17 and ball elements 16 are provided, each being circumferentially disposed 120° from one another. I have found that this provides an especially desirable balanced drive for the nut body, the balls 16 not only tending to share the load on the transmission in equal amounts but also tending to centralize a portion of the nut body. The opposite ends of the nut body are provided with recesses 106, 108 in which end bearings 52, 54 respectively are press-fitted. These bearings engage the cylindrical surface of the screw shaft 12 as mentioned previously. In the other respects the structure of the modified transmission 90 is generally similar to that of the embodiment illustrated and described in connection with FIG. 1-3.

During assembly of the devices of FIGS. 4 and 5, and FIGS. 6 and 7, involving either two or three balls, the procedure that would be followed is the same as that of the first embodiment, as far as installing the first ball is concerned. Following such installation the thread groove 26 will automatically be in the proper position to accept the second (and third) ball, without further adjustment in the axial position of the nut body with respect to the screw shaft being required.

For the devices shown in FIGS. 4–5 and 6–7, involving multiple ball elements 16, the particular arrangement wherein the socket members 17 are yieldably retained in their respective bores by the washers 46, has been found to be especially desirable from the standpoint of improving the ability of the ball elements 16 to share the load more or less equally, and from the standpoint of smoothing out the rate of travel of the nut body even in the presence of slight variations in the thread pitch from point to point along the screw shaft 12. In the event that one particular ball tends to momentarily assume a larger share of the load, it can shift slightly in a radially outward direction (with its corresponding socket member 17) as permitted by the respective spring washer 46. This has the beneficial effect of reducing the load on the one ball, whereas the remaining ball or balls will in turn assume a greater share of the load. Accordingly, by the present construction, minor variations in thread pitch will not result in momentary or instantaneous shock loads being applied to one ball element to the exclusion of the others. Such would not be the case if the ball elements 16 were held captive and rigidly backed by the nut body, as was true in many of the prior art devices. Also, the use of multiple spring-biased ball mountings tends to average out the thread lead, resulting in less inconsistency and smoother travel of the nut body. Accordingly, there is improved operation, as can be readily appreciated, with a minimum of backlash.

Figure 11:
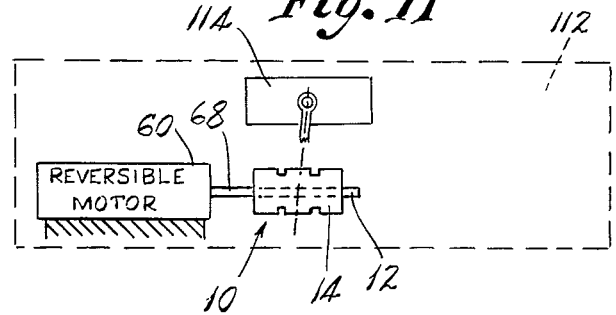
FIG. 11 is a diagrammatic representation showing the use of the transmission in a ticket printer device.

Whereas the simplified and improved transmission of the present invention, designated generally by the numeral 10, has uses in a variety of light-load environments, it is particularly well suited for use in a ticket printer machine, for example, such as that diagrammatically illustrated and designated 112 in FIG. 11, wherein the shaft of the reversible electric motor 60 is integral with the transmission shaft 12, and the output member or nut 14 of the transmission 10 is coupled to an assemblage 114 of the ticket printer 112, which requires a reciprocative movement of a subassembly therein. Energization of the motor 60 for turning in one direction will effect a linear movement of the nut 14 in one direction; reversing of the motor 60 for turning in the opposite direction will effect an opposite linear movement of the nut 14. Many other uses of the transmission 10 are possible, and the showing of FIG. 11 is illustrative of merely one of such use.

From the above it can be seen that I have provided a novel and improved low-friction mechanical transmission which is both simple in construction and reliable in operation. The unit can be readily assembled with only a minimum of time and effort being required, and without the need for special assembly tools. The device is thus seen to represent a distinct advance and improvement in the technology of low-cost, low-friction transmission devices.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention.

I claim:

1. A low-friction mechanical transmission for converting between rotary and linear motion, comprising in combination:
   (a) an elongate screw shaft having a helical thread groove,
   (b) a ball disposed in said groove,
   (c) a nut body movable along said screw shaft and having a recess in which the ball is received,
   (d) said recess having a circular load surface surrounding a circumference of the ball and engageable therewith, and having another load surface centrally disposed with respect to said circular load surface and displaced laterally therefrom, said other load surface being engageable with a small area of the ball,
   (e) said thread groove being characterized by a pair of substantially helical intersecting troughs, each trough being partially circular in cross section and said troughs intersecting one another adjacent the root of the groove,
   (f) the radii of curvature of said troughs being greater than the radius of said ball whereby the latter has a relatively small area of contact with the surface of a trough at a point on the ball which, as the nut body traverses the screw shaft, is substantially aligned with and opposite to the resultant of the forces existing between the ball and the recess.

2. The invention as defined in claim 1, wherein:
(a) said nut body has a radial bore,
(b) a socket member carried in said bore, and
(c) spring means disposed in said bore and engageable with the socket member, biasing it in a radially inward direction,
(d) said ball-carrying recess being disposed in said socket member.

3. The invention as defined in claim 2, wherein:
(a) said radial bore is of substantially cylindrical configuration and has a transverse annular groove in its surface,
(b) said spring means comprising a resilient, bowed, snap retainer ring carried in the groove and engaging the socket member.

4. The invention as defined in claim 2, wherein:
(a) said radial bore has a shoulder,
(b) means on said socket member defining a cooperable shoulder engageable with the shoulder of said bore,
(c) the engagement of said shoulders limiting the radially inward movement of said socket member and ball with respect to the radial bore of the nut body.

5. The invention as defined in claim 2, wherein:
(a) said radial bore has a shoulder,
(b) means on said socket member defining a cooperable shoulder engageable with the shoulder of said bore,
(c) said spring means normally biasing said shoulders into engagement with one another, and yielding in a radially outward direction in response to radially outward movement of the socket member resulting from pressure exerted by the ball on the wall of the recess socket.

6. The invention as defined in claim 1, wherein:
(a) said recess is cup-shaped,
(b) the diameter of the recess being on the same order of magnitude as the diameter of the ball,
(c) the depth of the recess being on the same order of magnitude as the radius of the ball.

7. The invention as defined in claim 6, wherein:
(a) said circular load surface comprises a portion of the inner surface of said recess, adjacent its lip.

8. The invention as defined in claim 6, wherein:
(a) said other load surface comprises a portion of the bottom wall of said recess.

9. The invention as defined in claim 1, wherein:
(a) said nut body has an axial bore with a pair of annular recesses near its opposite ends, and
(b) end bearings disposed in said recesses, respectively, and engageable with the surface of the screw shaft as the nut body travels therealong.

10. The invention as defined in claim 1, and further including:
(a) additional balls disposed in said helical thread groove,
(b) said nut body having additional receses in which said additional balls are received, respectively, and
(c) spring means associated with said additional recesess and biasing said additional balls in radially inward directions,
(d) said spring means selectively yielding in response to radially outward movement of the respective socket members, resulting from pressure exerted on the respective balls by the screw shaft, thereby reducing the likelihood jamming, and tending to smooth out the travel of the nut and eliminate variations which would otherwise occur due to slight inconsistencies in thread pitch along various points in the screw shaft.

11. The invention as defined in claim 10, wherein:
(a) said nut body has an axial bore with an annular recess disposed near one end,
(b) an end bearing carried in said recess and enageable with the surface of the screw shaft as the nut body travels therealong,
(c) said bearing tending to centralize the one end of the body with respect to the screw shaft,
(d) said balls being disposed nearer the other end of the body,
(e) said balls tending to centralize other portions of the body with respect to the screw shaft.

12. The invention as defined in claim 11, wherein:
(a) said balls are circumferentially disposed substantially 120° from one another about the periphery of the nut body.

13. The invention as defined in claim 1, and further including:
(a) an additional ball disposed in said helical thread groove,
(b) said nut body having an additional recess in which said additional ball is received.
(c) said balls being circumferentially disposed substantially 90° from one another.

14. The invention as defined in claim 1, wherein:
(a) for a given direction of axial travel of the nut body with respect to the screw shaft, the ball engages solely one of said troughs, and is completely disengaged from and free of the other of said troughs.

15. The invention as defined in claim 1, wherein:
(a) the spiral represented by the engagement of the ball with multiple points along one trough, and the crest diameter of the screw shaft, are held concentric with one another to a tolerance of substantially 0.2% or better.

16. The invention as defined in claim 1, and further including:
(a) an electric motor having a rotor,
(b) a motor shaft turnably carrying said rotor,
(c) said motor shaft being connected to said screw shaft to be power driven by said motor.

17. The invention as defined in claim 1, wherein:
(a) said nut body has a radial bore of substantially cylindrical configuration, said bore having a transverse annular groove,
(b) a socket member carried in said bore,
(c) spring means comprising a resilient, bowed, snap retainer ring carried in the groove and engaging the socket member, biasing latter in a radially inward direction,
(d) said ball-carrying recess being disposed in said socket member,
(e) said radial bore having a shoulder,
(f) means on said socket member, defining a cooperable shoulder engageable with the shoulder of said bore,
(g) the engagement of said shoulders limiting the radially inward movement of said socket member and said ball with respect to the radial bore of the nut body, (h) said spring means normally biasing said shoulders into engagement with one another, and yielding in a radially outward direction in response to radially outward movement of the socket member, resulting from pressue exerted by the ball on the walls of the recess, (i) said recess being cup-shaped, (j) the diameter of said recess being on the same order of magnitude as the diameter of the ball, (k) the depth of the recess being on the same order of magnitude as the radius of the ball, (l) said circular load surface comprising a portion of the inner surface of said recess, adjacent its lip, (m) said other load surface comprising a portion of the bottom wall of said recess, (n) said nut body comprising an axial bore having a pair of annular recesses near its opposite ends, and (o) end bearings disposed in said recesses, respectively, and engageable with the surface of the screw shaft as the nut body travels therealong.

18. A low-friction, low-cost mechanical transmission for converting between rotary and linear motion, comprising in combination:

(a) an elongate screw shaft having a helical thread groove, (b) a ball disposed in said groove, (c) a nut body movable along said screw shaft and having a radial bore, (d) a socket member disposed in said radial bore and movable along the axis of said bore, said socket member having a recess in which the ball is nested, (e) said radial bore of the nut body having an annular groove encircling its axis, and (f) a resilient, bowed, spring-retainer snap ring disposed in the groove of the bore of the nut body and bearing against one end of said socket member to hold the latter captive and bias it toward said screw shaft.

19. The invention as claimed in claim 18, wherein:

(a) the snap ring has a yoke portion of increased width, and has apertured end portions of increased widths, said yoke and end portions being adapted for engagement with said end of the socket member.

* * * * *